US006517762B1

(12) United States Patent
Tsunekawa et al.

(10) Patent No.: US 6,517,762 B1
(45) Date of Patent: Feb. 11, 2003

(54) POLYESTER FILM AND PRODUCTION METHOD THEREOF

(75) Inventors: Tetsuya Tsunekawa, Otsu (JP); Takuji Higashioji, Kyoto (JP); Kenji Tsunashima, Kyoto (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/215,304

(22) Filed: Dec. 18, 1998

(30) Foreign Application Priority Data

Dec. 18, 1997 (JP) .............................................. 9-349155
Jun. 15, 1998 (JP) ............................................ 10-166473

(51) Int. Cl.[7] ........................ B29C 55/20; B29C 55/12; B29C 55/14; B29C 55/16
(52) U.S. Cl. ................................ 264/290.2; 264/210.7; 264/235.8; 264/289.6; 264/342 RE; 264/346
(58) Field of Search ........................... 264/210.7, 235.8, 264/289.6, 290.2, 342 RE, 346

(56) References Cited

U.S. PATENT DOCUMENTS

| | | | | |
|---|---|---|---|---|
| 2,968,065 A | * | 1/1961 | Gronholz | |
| 4,110,395 A | * | 8/1978 | Akutin et al. | 264/210.7 |
| 4,230,658 A | | 10/1980 | Matsukura et al. | 264/235.8 |
| 4,390,683 A | * | 6/1983 | Yatsu et al. | 528/194 |
| 4,497,865 A | | 2/1985 | Minami et al. | 428/336 |
| 4,587,071 A | * | 5/1986 | Minami et al. | 264/210.7 |
| 4,766,033 A | | 8/1988 | Nakao et al. | 428/332 |
| 4,814,221 A | | 3/1989 | Utsumi | 428/220 |
| 5,061,571 A | * | 10/1991 | Sakamoto | 428/480 |
| 5,085,933 A | | 2/1992 | Katoh et al. | 428/332 |
| 5,252,533 A | | 10/1993 | Yasuda et al. | 503/227 |
| 5,318,833 A | * | 6/1994 | Fujimoto et al. | 428/304.4 |
| 5,376,711 A | * | 12/1994 | Fujimoto et al. | 524/430 |
| 5,525,404 A | | 6/1996 | Hatanaka et al. | 428/212 |
| 5,665,454 A | * | 9/1997 | Hosoi et al. | 428/141 |
| 5,753,377 A | * | 5/1998 | Takahashi et al. | 428/480 |
| 5,885,501 A | | 3/1999 | Gardner et al. | 264/216 |
| 5,919,536 A | * | 7/1999 | Bennett et al. | 428/35.5 |
| 6,090,898 A | * | 7/2000 | Tsunekawa et al. | 525/444 |

FOREIGN PATENT DOCUMENTS

| | | |
|---|---|---|
| EP | 0356904 A2 | 3/1990 |
| EP | 0452121 A1 | 10/1991 |
| EP | 0609077 A1 | 8/1994 |
| WO | WO9413482 A1 | 6/1994 |

OTHER PUBLICATIONS

"Polyester Film Lines Can Raise Throughput Rates 40 to 50%", Gabriele, M.C., Modern Plastics International, vol. 27, No. 10, Oct. 1, 1997, p. 34.

"Magnetic Linear Drive Increases Speed of Biaxial Orientation Unit", Colvin, R., Modern Plastics International, vol. 26, No. 3, Mar. 1, 1996, pp. 26–27.

* cited by examiner

Primary Examiner—Jan H. Silbaugh
Assistant Examiner—Michael I. Poe
(74) Attorney, Agent, or Firm—Birch Stewart Kolasch & Birch LLP

(57) ABSTRACT

The object of the present invention is to provide a method for producing a polyester film excellent in rigidity, toughness, dimensional stability, electric properties, etc. and less in thickness fluctuation and surface defects, hence very suitable as a film for various industrial materials such as magnetic recording media, capacitors, heat transfer ribbons and thermal mimeographic stencil paper. The first method of the present invention is a method for producing a polyester film, in which a film made of a resin mainly composed of a polyester is simultaneously biaxially stretched by a simultaneously biaxially stretching tenter oven, comprising the step of effecting small-ratio stretching at an area stretching ratio of 1.0005 to 3.0 times three times or more, to achieve a total area stretching ratio of 25 to 150 times, and the second method of the present invention is a method for producing a polyester film, in which a film made of a resin mainly composed of a polyester is stretched using a simultaneously biaxially stretching tenter oven, comprising the step of effecting a series of operation consisting of stretching and subsequent relaxation twice to less than 10000 times, to achieve a total area stretching ratio of 25 to 150 times.

5 Claims, No Drawings

POLYESTER FILM AND PRODUCTION METHOD THEREOF

TECHNICAL FIELD

The present invention relates to a polyester film highly improved in film properties and quality compared to conventional polyester films, and a production method thereof.

More particularly, the present invention relates to a polyester film excellent in rigidity, toughness, dimensional stability, electric properties, etc. and less in thickness fluctuation and surface defects, hence very suitable as a film for various industrial materials such as magnetic recording media, capacitors, heat transfer ribbons, thermal mimeographic stencil paper, etc. The present invention also relates to a method for producing said film.

BACKGROUND ARTS

Plastic films can be continuously produced as films with large areas, though this cannot be achieved with other materials. Because of their features of high strength, durability, clarity, flexibility and good surface properties, they are used in various fields needing them in large quantities such as magnetic recording media, agriculture, packaging, building materials, etc.

Above all, biaxially oriented polyester films are used in various fields since they are excellent in mechanical properties, thermal properties, electric properties and chemicals resistance, and especially as base films for magnetic tapes, they are incomparable to any other materials.

In this field, especially in recent years, the base films are further requested to be thinner for meeting the demands for lighter-weight and smaller-sized devices and longer-time recording capability. The films for heat transfer ribbons, capacitors and thermal mimeographic stencil paper are also highly requested to be thinner in recent years.

However, if a thinner film is produced, the mechanical strength becomes insufficient to make the film less stiff and likely to be elongated. So, for example, in the application as a magnetic recording medium, the tape is likely to be damaged, or the head touch becomes poor to lower electromagnetic conversion properties. Furthermore, if a thinner film is used as a heat transfer ribbon, the ribbon cannot be kept flat during printing, to cause irregular printing or over-transfer. A thinner film used as a capacitor lowers the dielectric breakdown voltage disadvantageously.

In the demand for thinner films, films are desired to have higher strength, by improving mechanical properties such as tensile properties including Young's modulus.

So, various methods have been studied to enhance the strengths of films.

A generally known method for enhancing the strength of a biaxially oriented polyester film is to re-stretch a once longitudinally and laterally stretched film in the longitudinal direction for enhancing the strength in the machine direction as the socalled longitudinal re-stretching method (e.g., Japanese Patent Publication (Kokoku) Nos. 42-9270 and 43-3040, Japanese Patent Laid-Open (Kokai) Nos. 46-1119 and 46-1120, etc.). For further enhancing the strength also in the transverse direction, it is proposed to re-stretch said longitudinally re-stretched film as the longitudinal re-stretching and lateral re-stretching method (e.g., Japanese Patent Laid Open (Kokai) Nos. 50-133276 and 55-22915, etc.). Furthermore, it is proposed to once stretch the film in the longitudinal direction in 2 or more steps and then to stretch in the lateral direction as the multi-step longitudinal stretching method (e.g., Japanese Patent Publication (Kokoku) Nos. 52-33666 and 57-49377, etc.).

The multi-step longitudinal stretching method is superior to the longitudinal re-stretching method and the longitudinal re-stretching and lateral re-stretching method in view of higher strength, less film thickness fluctuation and higher productivity. However, the problem that a film with a higher strength becomes larger also in heat shrinkage and is more frequently broken cannot be solved by the multi-step longitudinal stretching method either.

It is also proposed to stretch a film three or more times continuously repetitively in at least either the machine direction or the transverse direction as the small-ratio repetitive stretching method (supermulti-step stretching method) which is one of conventionally known film production methods and is similar to the method of the present invention described later (Japanese Patent Laid-Open (Kokai) Nos. 8-224777 and 9-57845). However, the inventions described in said Japanese Patent Laid-Open (Kokai) Nos. 8-224777 and 9-57845 simply show examples of. mainly sequential biaxial stretching, and do not refer specifically to any mechanism, apparatus or process conditions effective for simultaneous biaxial stretching. In addition, they do not refer to the effectiveness of the simultaneous biaxial stretching method by a linear motor system propose to be used as a preferable apparatus in the present invention since it allows high ratio stretching.

On the other hand, in recent years, linear motor driven simultaneously biaxial stretching tenter ovens have been developed, and attract attention because of their high film forming speeds, etc. (e.g., Japanese Patent Publication (Kokoku) No. 51-33590, U.S. Pat. Nos. 4,853,602 and 4,675,582, etc.).

The conventional simultaneous biaxial stretching methods such as the screw method for spreading the clip interval by guiding clips in the grooves of screws and the pantograph method for spreading the clip interval using a pantograph have such problems that the film forming speed is low, that it is not easy to change conditions such as stretching ratio, and that stretching at a high ratio is not easy. On the contrary, the linear motor driven simultaneous biaxial stretching method has possibility to solve these problems all at once.

Said Japanese Patent Publication No. 51-33590 discloses to change the tenter clip interval by the electric force generated by a linear motor for allowing highly efficient production. Furthermore, said U.S. Pat. No. 4,853,602 discloses a stretching system using a linear motor, said U.S. Pat. No. 4,675,582 discloses a system effective for controlling many linear motors along the stretching section. However, even these U.S. Patents do not refer to the stretching method disclosed in the present invention or the high quality polyester film intended to be obtained by said method.

The process conditions for producing a polyester film with excellent film properties and quality by the linear motor driven simultaneous biaxial stretching were unknown, and any effective stretching method was not established yet.

As described above, the techniques for producing a polyester film with high film properties and quality are yet to be improved, and it has been demanded to develop a new technique in this industrial field.

DISCLOSURE OF THE INVENTION

The object of the present invention is to provide a high quality polyester film excellent in rigidity, toughness and dimensional stability and less in thickness fluctuation and surface defects, and a production method thereof.

The inventors studied intensively any method for improving the film properties and quality of polyester films to the extreme extent.

As a result, it was found that the object of the present invention can be achieved by a method for producing a polyester film using a simultaneously biaxially stretching tenter oven, comprising the step of effecting small-ratio stretching at an area stretching rate of 1.0005 to 3.0 times three times or more, to achieve a total area stretching ratio of 25 to 150 times, as a first method of the present invention for producing a polyester film.

It was also found that the object of the present invention can also be achieved by a method comprising the step of effecting a series of operation consisting of stretching and subsequent relaxation twice to less than 10000 times, to achieve a total area stretching ratio of 25 to 15.0 times, as a second method of the present invention for producing a polyester film.

The first or second method of the present invention was adopted, it was surprisingly found that (1) the Young's modulus of a polyester film becomes very large, while the heat shrinkage becomes small,
(2) the stretching ratio can be raised to enhance the productivity,
(3) the film fluctuates less in thickness and is broken less frequently, and
(4) the film is likely to be higher in the degree of crystallinity, and even if the temperature of the heat treatment zone is lowered, the heat shrinkage does not increase.

Thus, the present invention has been completed.

The gist of the present invention is the method for producing a polyester film described below as the first or second method.

The first method of the present invention is a method for producing a polyester film, in which a film made of a resin mainly composed of a polyester is stretched by a simultaneously biaxially stretching tenter oven, comprising the step of effecting small-ratio stretching at an area stretching ratio of 1.0005 to 3.0 times three times or more, to achieve a total area stretching ratio of 25 to 150 times (hereinafter called this first method of the invention is called "production method (I)").

The polyester film production method (I) of the present invention includes the following preferable embodiments.
(a) Effecting the small-ratio stretching continuously three or more times.
(b) Repeating the small-ratio stretching 10 to less than 10000 times.
(c) Effecting the small-ratio stretching of a cast film in a temperature range of (glass transition temperature (Tg)+10)° C. to (Tg+120)° C.
(d) Continuously repeating the small-ratio stretching of a cast film till the degree of crystallinity of the film reaches 3% to less than 30%.

The second method of the present invention is a method for producing a polyester film, in which a film made of a resin mainly composed of a polyester is stretched using a simultaneously biaxially stretching tenter oven, comprising the step of effecting a series of operation consisting of stretching and subsequent relaxation twice to less than 10000 times, to achieve a total area stretching ratio of 25 to 150 times (hereinafter this second method is called "production method (II)").

The polyester film production methods (I) and (II) of the present invention include the following preferable embodiment.

(a) The clips are driven by a linear motor system.

The polyester film of the present invention is produced by said production method (I) or (II) of the present invention.

The polyester film includes the following preferable embodiments.
(a) The sum of the Young's modulus in the machine direction of the film and that in the transverse direction is 8 to 30 GPa, and the sum of heat shrinkage percentages at 100° C. for 30 minutes is 2% or less.
(b) The degree of crystallinity is 30 to 90%.
(c) The polyester is polyethylene terephthalate, polyethylene naphthalate or their copolymer or modified polymer.
(d) The inherent viscosity is 0.6 or more.

The polyester film of the present invention is suitable for such applications as magnetic recording media, capacitors, heat transfer ribbons and thermal mimeographic base films.

The present invention is described below in more detail.

THE BEST EMBODIMENTS OF THE INVENTION

The polyester referred to in the present invention is a polymer containing at least 80 wt % of a polymer obtained by polycondensation of a diol and a dicarboxylic acid. The dicarboxylic acids which can be used here typically include terephthalic acid, isophthalic acid, phthalic acid, naphthalenedicarboxylic acid, adipic acid and sebacic acid, and the diols which can be used here include typically ethylene glycol, trimethylene glycol, tetramethylene glycol and cyclohexane dimethanol.

The polyesters which can be used here include, for example, polymethylene terephthalate, polyethylene terephthalate, polypropylene terephthalate, polyethylene isophthalate, polytetramethylene terephthalate, polyethylene-p-oxybenzoate, poly-1,4-cyclohexylenedimethylene terephthalate and polyethylene-2,6-naphthalate. These polyesters can be homopolymers and copolymers, and the comonomers which can be used here include, for example, diols such as diethylene glycol, neopentyl glycol and polyalkylene glycols, dicarboxylic acids such as adipic acid, sebacic acid, phthalic acid, isophthalic acid and 2,6-naphthalenedicarboxylic acid, and hydroxycarboxylic acids such as hydroxybenzoic acid and 6-hydroxy-2-naphthoic acid.

In the present invention, especially polyethylene terephthalate, polyethylene naphthalate (polyethylene-2,6-naphthalate), their copolymer and modified polymers are preferable since the effect of the present invention can be highly manifested.

In the present invention, it is preferable that the inherent viscosity of the polyester is 0.6 or more. More preferable is 0.8 or more and most preferable is 1.0 or more. A polyester with a high molecular weight usually has a disadvantage that the heat shrinkage of the film becomes larger at a higher Young's modulus. However, according to the production method of the present invention, since the microstructure is effectively eased while the total area stretching ratio of the film is enhanced, the heat shrinkage can be lessened.

In the present invention, "stretching" refers to the operation to make a film oriented in the machine direction or in the transverse direction by carrying the film while holding its both the edges by clips using a simultaneously biaxially stretching tenter oven for pulling it in at least either the machine direction or the transverse direction. The "machine direction" of a film refers to the longitudinal direction of the film, and the "transverse direction" refers to the lateral direction of the film. The "simultaneous biaxial stretching"

refers to the operation to stretch a film simultaneously in both the machine direction and the transverse direction. Before and/or after the "simultaneous biaxial stretching", further other stretching a can be effected. For example, stretching in the transverse direction or the machine direction or sequentially in both the directions can be followed by the simultaneous stretching in the machine direction and the transverse direction, or the simultaneous biaxial stretching can be followed by the stretching in the transverse direction or the machine direction or sequentially in both the directions, within the scope of the present invention.

It can be said preferable to use a linear motor driven simultaneously biaxially stretching tenter oven in the present invention as a stretcher capable of freely changing the stretching direction and the stretching ratio.

As described before, a linear motor driven simultaneously biaxially stretching tenter oven attracts attention since it
(1) allows the film forming speed and the film width to be increased to not lower or not smaller than those achieved in the conventional sequential biaxial stretching,
(2) allows stretching at a high ratio, and
(3) allows the film deformation pattern to be freely changed in the steps of stretching, heat treatment and relaxation.

In the present invention, it is especially preferable to adopt the supermulti-step stretching using the linear motor driven simultaneously biaxially stretching tenter oven, for obtaining a polyester film with high film properties and quality at a low cost.

The production method (I) of the present invention is described below. In this method, it is necessary that the area stretching ratio of one time of small-ratio stretching in the supermulti-step stretching is set at 1.0005 to 3.0 times, that the small-ratio stretching is effected three or more times and that the total area stretching ratio is 25 to 150 times.

The "area stretching ratio" refers to the product obtained by multiplying the stretching ratio in the machine direction of the film by the stretching ratio in the transverse direction. In the present invention, "small-ratio stretching" refers to stretching at a stretching ratio smaller than usual, generally the stretching in which the stretching ratio is 3.0 times or less as the area stretching ratio.

In the present invention, the small-ratio stretching as described above is repeated. If the area stretching ratio by one time of small-ratio stretching exceeds 3.0 times, the intended effects of the present invention are unlikely to be obtained, and if less than 1.0005 times, the stretching cannot be a practical requirement.

It is more preferable that the area stretching ratio by one time of small-ratio stretching is 1.005 to 2.0 times, and a further more preferable range is 1.01 to 1.5 times. It is preferable that the frequency of small-ratio stretching in the production method (I) is 10 to less than 10000 times, and a more preferable range is 50 to less than 1000 times. Furthermore, it is preferable to effect the small-ratio stretching continuously three or more times. The final total area stretching ratio must be 25 to 150 times. A preferable range is 30 to 120 times, and a more preferable range is 50 to 100 times. If the total area stretching ratio is less than 25 times, the intended effects of the present invention cannot be obtained, and it is practically difficult to achieve a total stretching ratio of more than 150 times.

The "one time of small-ratio stretching" in the present invention is defined as
(1) halting stretching after each time of small-ratio stretching as shown in the production method (I), or
(2) a series of continuous operation consisting of stretching and relaxation as shown in the production method (II), or
(3) continuous stretching without changing stretching conditions such as stretching mode, stretching ratio, temperature and stretching rate.

In the case of the above (3), that is, in the case of continuous stretching, the relation between time and the stretching ratio in the machine or transverse direction (or clip speed) can be expressed by a straight line (monotonous increase) or a curve. In the case of a curve, a point of inflection in the curve expressing the relation between time and the stretching ratio in the machine or transverse direction is an end of each time of small-ratio stretching. The "stretching mode" refers to any of "longitudinal stretching" mode, "lateral stretching" mode and "simultaneous biaxial stretching" mode. In the above (1), when stretching is halted, it is preferable to halt for a period corresponding to $1/100$ to $4/5$ of the time taken for stretching. A more preferable stretching halting period is $1/100$ to $3/5$ of the time taken for the stretching effected immediately before, and a more preferable period is $1/10$ to $1/2$. In the present invention, it is preferable that the stretching rate is 2000 to 300000%/min in either the machine or transverse direction. A more preferable range is 5000 to 200000%/min, and a further more preferable range is 10000 to 100000%/min. It is preferable that the final film forming speed in the machine direction is 200 m/min or more. More preferable is 300 m/min or more, and further more preferable is 400 m/min or more. The stretching halting period in the above (1) can also be changed in reference to the stretching rate at that moment.

In the present invention, the stretching temperature for stretching the polyester film at a small ratio is not especially limited. When a cast film is drawn at a small ratio, it is preferable to keep the temperature at (the glass transition temperature of the polyester (Tg)+10)° C. to (Tg+120)° C. A more preferable range is (Tg+20)° C. to (Tg+80)° C. If the stretching temperature is lower than (Tg+10)° C., the orientation by stretching occurs too much, and it is difficult to stretch to a high ratio.

On the other hand, if the stretching temperature exceeds (Tg+120)° C., it is difficult to make the polymer chains oriented slightly, which is necessary for easing the structure, and furthermore in the stretching step, the oligomer is scattered heavily. In the present invention it is preferable to stretch at a small ratio at which the yield point in the stress-strain curve of each stretching temperature is going to be reached. The reason is that under this condition, since the stretching tension corresponds to the strain at 1:1 relation, the uniformity in the thickness of the film is little adversely affected by stretching, and therefore that a high quality polyester film can be easily obtained. In the heat treatment effected at (Tg+120)° C. to less than the melting point for immobilizing the structure of the film, the small-ratio stretching of the present invention is effective. In this case, it is preferable that the area stretching ratio is 1.5 times or less. More preferable is 1.2 times or less. If the small-ratio stretching is repeated in this ratio range, the mechanical properties of the film are likely to be improved.

In the present invention, the small-ratio stretching can be repeated at any step while a cast film made of a resin mainly composed of a polyester is stretched and heat-treated to obtain a biaxially oriented polyester film. However, it is preferable to repeat the small-ratio stretching continuously three times or more in any step till the degree of crystallinity of the cast film reaches 3% to less than 30% or in said heat treatment step. The cast film in this case refers to a film obtained by supplying sufficiently dried raw pellets into an extruder extruding from a T die onto a revolving metallic casting drum as a sheet, and cooling and solidifying it or a film obtained by supplying non-dried pellets into a vented extruder and processing similarly.

It is preferable to repeat the small-ratio stretching continuously in the initial stretching step before the cast film eased in volume becomes high in the degree of crystallinity. When the degree of crystallinity is less than 3%, even if the small-ratio stretching is repeated continuously three times or more, it is difficult to eliminate the mechanical strain caused in the subsequent simultaneous biaxial stretching, and it tends to be difficult to enhance the stretching ratio. In addition, the film is likely to decline in Young's modulus and to remarkably large in heat shrinkage. It is more preferable that the degree of crystallinity of the film obtained by continuously repeating the small-ratio stretching of the present invention on the cast film is 5% to less than 25%. A further more preferable range is 10% to less than 20%. For the film of more than 30% in the degree of crystallinity, the small-ratio stretching can be repeated, but one time of stretching at a high ratio can also be effected. Especially when the polymer is liable to be crystallized due to the influence of additives, etc., it may be preferable to stretch at a high ratio at a time than repeating the small-ratio stretching, for obtaining a film excellent in film properties and quality., Furthermore, a film of more than 30% in the degree of crystallinity is likely to be eased in volume by the small-ratio stretching and is crystallized before stretching at a high ratio, and it tends to be difficult to enhance the Young's modulus. In this case, any special measure such as stretching at a high ratio at a time must be taken.

The production method (II) is described below. This method must comprise effecting a series of operation to stretch and subsequently relax a film, twice to less than 10000 times, and the total area stretching ratio must be 25 to 150 times.

In this case, "relaxation" refers to the operation to ease stress by carrying a film while holding both the edges of the film by clips, for relaxing the film in either the machine direction or the transverse direction. Furthermore, in the present invention, the film can also be stretched in either the machine direction or the transverse direction, while being relaxed in the other direction.

In the present invention, when stretching and relaxation are effected simultaneously, the operation effected at an area stretching ratio of 1 or more is called "stretching", and a case of less than 1, "relaxation".

The "area stretching ratio" is the product obtained by multiplying the dimensional change rate in the machine direction by that in the transverse direction, and the "dimensional change rate" is the rate of the length after stretching or relaxing to the original length. When the. dimensional change rate is 1 or more, the value expresses a stretching ratio, and when less than 1, the difference between the dimensional change rate (%) and 100 is the relaxation rate (%). In the prior arts, relaxation treatment is mainly effected after completion of film stretching or in the cooling step after completion of stretching and heat treatment. However, in the present invention, it is preferable that a cast film obtained by melt-extruding into a sheet and casting it is stretched to be oriented, and relaxed at any stage before the intended final stretching ratio is reached.

As a stretcher capable of freely changing the directions of such stretching and relaxation, stretching ratio and relaxation rate, it is preferable to use a linear motor driven, simultaneously biaxially stretching tenter oven in the present invention. The features of a linear motor driven simultaneously biaxially stretching tenter oven are, as described before, that the film forming speed and the film width can be increased to not lower or not smaller than those achieved in the conventional sequential biaxial stretching, that stretching at a high ratio can be effected, and that the film deformation pattern can be freely changed in the steps of stretching, heat treatment and relaxation. In the present invention, it is especially preferable for obtaining a polyester film with high film properties and quality at a low cost, to form the film using the linear motor driven simultaneously biaxially stretching tenter oven and by combining stretching and relaxation.

In the present invention, the stretching stage when relaxation is to be effected before the cast film is stretched to a high ratio is not especially limited, but the operation to stretch and subsequently relax is effected twice to less than 10000 times. A more preferable range is 3 to less than 1000 times, and a further more preferable range is 5 to less than 100 times. If the operation is effected only once, the intended effects of the present invention are small since the frequency of relaxation is too small, and effecting the operation 10000 times or more is unpreferable since practical difficulty is often involved. The stretching and the relaxation can be effected in the machine direction and the transverse direction simultanously, or in either direction only. Furthermore, the series of operation repeated twice or more in the present inventions includes not only the simply alternate operation of stretching and relaxation, but also another series of operation with at least one time of stretching or relaxation inserted between stretching and relaxation, for example, "-stretching-relaxation-relaxation-stretching" or "-relaxation-stretching-stretching-relaxation-".

In the production method (II), the area stretching ratio by one time of stretching and the relaxation rate by one time of relaxation are not especially limited. However, it is preferable that the area stretching ratio by one time of stretching is 1.005 to 10 times, and that the relaxation rate is 0.1 to 80% to the respective lengths in the machine and transverse directions immediately before relaxation. A more preferable area stretching ratio range by one time of stretching is 1.05 to 5 times, and a further more preferable range is 1.1 to 3 times. If the area stretching ratio by one time of stretching exceeds 10 times, it is difficult to obtain the intended effects of the present invention, and film breaking may occur frequently. An area stretching ratio of less than 1.005 times cannot be a practical requirement, and it is often difficult to set the apparatus to achieve the ratio. So, a preferable range is 1.005 to 10 times. A more preferable relaxation rate range is 0.5 to 60%, and a further more preferable range is 1 to 40%. If the relaxation rate exceeds 80%, the intended effects of the present invention by stretching become small and the film flatness and productivity may be worsened. If the relaxation rate is less than 0.1%, it is often difficult to set the apparatus to achieve the ratio. So, a preferable range is 0.1 to 80%.

If the small-ratio stretching as in the production method (I) or the series of operation consisting of stretching and relaxing as in the production method (II) is continuously repeated, the following effects can be preferably obtained probably because the polyester chains in the film are disentangled.

(1) The easing of structure and volume is accelerated, and it becomes easier to obtain a film with a high Young's modulus and small heat shrinkage.

(2) The total area stretching ratio can be increased to improve film productivity and to allow cost reduction.

The dimension change rates of the small-ratio stretching (production method (I)) or stretching and relaxation (production method (II)) executed by a plurality of times can be equal or different every time, and the respective stretching ratios and relaxation rates in the machine direction and the transverse direction can also be properly selected to achieve the desired film properties. Furthermore, as described before, the small-ratio stretching can also be effected in either the machine direction or the transverse direction only. It is desirable that the total ratio of the stretching ratio in the machine direction to that in the transverse direction is 0.9 to 1.1 for making the film isotropic for application as a floppy disc, or 0.7 to 1.0 for application as a video tape, etc. used in a magnetic recorder with the magnetic head revolved helically, or 1.0 to 1.3 for application as a data tape used in a magnetic recorder with the magnetic head revolved linearly.

It is preferable that the sum of the Young's modulus (YMD) in the machine direction (MD direction) and the Young's modulus (YTD) in the transverse direction (TD direction) of the film of the present invention, i.e., the total Young's modulus is in a range of 8 to 30 GPa, though depending on the polymer used. If the total Young's modulus is less than 8 GPa, the film is poor in practical applicability. If more than 30 GPa, great difficulty may be involved, and the film breaking may occur frequently. A more preferable Young's modulus range is 10 to 25 GPa, and an especially preferable range is 12 to 22 GPa. The balance between the Young's modulus in the machine direction and that in the transverse direction can be controlled by properly changing the respective total ratios in the machine and transverse directions.

As for the heat shrinkage of the film obtained in the present invention, it is preferable that the sum of the heat shrinkage percentage in the machine direction and that in the transverse direction at 100° C. for 30 minutes is 2% or less. A more preferable heat shrinkage sum range is 1% or less, and a further more preferable range is 0.5% or less. If the sum of heat shrinkage percentages is larger than 2%, wrinkling and poor flatness, etc. are likely to occur for example, in the polyester processing process, or in the magnetic layer coating step, calendering step, etc. in the production of magnetic recording media. So, it is preferable that the sum of heat shrinkage percentages is 2% or less. According to the production method disclosed in the present invention, it is easier to enhance the Young's modulus in the machine and transverse directions without increasing the heat shrinkage. That is, it is easier to obtain a polyester film of 8 to 30 GPa in the sum of the Young's modulus in the machine direction and that in the transverse direction and 2% or less in the sum of heat shrinkage percentages at 100° C. for 30 minutes.

According to the production method of the present invention, the easing-of the polyester structure is likely to take place, and the biaxially oriented and heat-treated film is likely to be higher in the degree of crystallinity. As described before, the degree of crystallinity of a film is 30 to 90% in the present invention, though depending on the polymer used, stretching ratio, heat treatment temperature, etc. Usually it is not easy to obtain a film of 50% or more in the degree of crystallinity by any industrially available production method, but such a film can be relatively easily obtained according to the production method of the present invention.

According to the production method of the present invention, since the film is likely to be higher in the degree of crystallinity, heat treatment at a temperature of 200° C. or higher is not necessarily required. If the temperature of heat treatments lowered, the contamination in the tenter oven by scattering of the oligomer and the amount of the oligomer on the film surface decrease advantageously for decreasing surface defects. A preferable range in the degree of crystallinity for obtaining a high quality polyester film with a high Young's modulus and small heat shrinkage is 40 to 80%, and a further more preferable range is 45 to 70%. If the degree of crystallinity is less than 30%, the immobilization of structure is often insufficient, and the heat shrinkage of the film becomes large unpreferably. If the degree of crystallinity exceeds 90%, film breaking occurs frequently, to lower processability in various film applications.

The polyester film of the present invention can contain inorganic particles and organic particles and other various additives such as antioxidant, antistatic agent and crystal nucleating agent. The compounds which can be used as the inorganic particles include, though not limited to, oxides such as silicon oxide, aluminum oxide, magnesium oxide and titanium oxide, compound oxides such as kaolin, talc and montmorillonite, carbonates such as calcium carbonate and barium carbonate, sulfates such as calcium sulfate and barium sulfate, titanates such as barium titanate and potassium titanate, phosphates such as calcium tertiary phosphate, calcium secondary phosphate and calcium primary phosphate, etc. Depending of the purpose, two or more of these compounds can also be used in combination.

The organic particles which can be used here include, though not limited to, vinyl based particles such as polystyrene particles or crosslinked polystyrene particles, styrene.acrylic particles or acrylic crosslinked particles, styrene.methacrylic particles or methacrylic crosslinked particles, benzoguanamine.formaldehyde particles, silicone particles, polytetrafluoroethylene particles, etc. Any organic polymeric fine particles, at least a component of which is insoluble in the polyester, can be used. It is also preferable that the organic particles are spherical and have a uniform particle size distribution in view of lubricity and uniform formation of projections on the film surface. The particle size, amount, form, etc. of the particles can be selected to suit the application and purpose concerned. Usually it is preferable that the average particle size is 0.05 μm to 3 μm, and that the particle content is 0.01 wt % to 10wt %.

The polyester film of the present invention can be a single-layer film, but can also be a laminate film consisting of two or more layers, in which a layer of another polymer such as a polyester, polyolefin, polyamide, polyvinylidene chloride or acrylic polymer is laminated directly or via an adhesive layer, etc. Especially a laminate film with a polyester layer laminated as a surface layer is useful as a base film for a magnetic recording medium in which surface properties are important, since the surface roughness of the film face as a magnetic recording face can be designed to be different from that on the other side to suit the application concerned.

The entire thickness of the film in the present invention can be decided properly to suit the application and purpose of the film concerned.

Usually for magnetic material application, it is preferable that the thickness is 1 μm to 20 μm. Above all, for a coating type magnetic recording medium for digital video, the preferable thickness range is 2 μm to 8 μm. and for a vapor deposition type magnetic recording medium for digital video, the preferable thickness range is 3 μm to 9 μm. Furthermore, among industrial material applications, the preferable thickness range for a heat transfer ribbon is 1 μm to 6 μm, and that for a capacitor is 0.5 μm to 15 μm. The preferable thickness range for thermal mimeographic stencil paper is 0.5 μm to 5 μm.

Examples of the polyester film production method of the present invention are described below, but the present invention is not of course limited thereto or thereby. As the polyester, polyethylene terephthalate is used in the following examples, and production conditions depend on the polyester used.

As the polyester, pellets of polyethylene terephathalate with an inherent viscosity of 0.65 are heated to 180° C. in vacuum, to be dried in vacuum for 3 hours or more, and are supplied into an extruder heated to a temperature of 270 to 300° C., being extruded from a T die as a sheet. To remove foreign matters and deteriorated polymer, it is preferable to use various filters, for example, filters of such materials as sintered metal, porous ceramic material, sand and wire gauze. Furthermore, as required, for better quantitative supply, a gear pump may also be used. The molten sheet is electrostatically brought into contact with a drum cooled to a surface temperature of 10 to 40° C., to be cooled and solidified, for obtaining a substantially amorphous cast film. In the case of a laminate film, two or more extruders and a manifold or laminating block are used to extrude a sheet with a molten polyester laminated. In this case, it is preferable that the ratio of the thickness of the cast film at the edges to the thickness of the film at the center is 1 to 10. A more preferable range is 1 to less than 5, and the most preferable range is 1 to less than 3. If the thickness ratio is less than 1 or more than 10, film breaking or clipping-off occurs frequently unpreferably. Then, the cast film is introduced into a linear motor driven simultaneously biaxially stretching tenter oven by holding both the edges of the film by clips, heated to 90~150° C. in a preheating zone, and stretched at a small ratio of 1.0005 to 3 times in area stretching ratio at least three times or more continuously. As another method, the film is stretched to achieve an area stretching ratio of 1.005 to 10 time sand relaxed at a relaxation rate of 0.1 to 80%, and this series of operation is effected continuously at least twice or more. In either method, it is preferable that the temperature of the clips used for holding the edges of the film is set in a range of 80 to 160° C. It is preferable that the stretching temperature in the stretching process is kept in a range of 90 to 150° C. However, the film can be once cooled, and stretched while inhibiting the crystallization of the film. Furthermore, when the polymer has a high molecular weight or is unlikely to be crystallized, it is preferable to raise the stretching temperature up to 200° C. It is also preferable that in the latter half of the stretching process, i.e., when a film with a plane orientation factor of 0.15 or more is stretched, the stretching temperature is gradually raised in 2 or more steps, during stretching. The stretching of the film by a simultaneously biaxially stretching tenter oven is effected as described above, to achieve a total area stretching ratio of 25 to 150 times. Then, the biaxially oriented polyester film is heat-treated in a range of 180° C. to less than the melting point, and relaxed preferably in a temperature range of 100 to 220° C. in the machine and transverse directions, preferably in a range of 1 to 6% in each direction in the cooling step from the heat set temperature, to make the film flat and stable dimensionally. The relaxation treatment can be effected in one or more steps, and the temperature distribution may also be changed. In this case, repeating the small-ratio stretching in the heat treatment step is also preferable for increasing the crystal size for enhancing the Young's modulus of the film. Then, the film is cooled to room temperature while being relaxed in the machine and transverse directions as required, and wound to obtain the intended polyester film.

In the present invention, to let the film have desirable surface properties such as adhesiveness, lubricity, releasability and electrification control, it is also preferable to coat the surface of the polyester film with any appropriate material, before or after stretching of the film by a simultaneously biaxially stretching tenter oven.

[Methods for Evaluating Physical Properties]

(1) Inherent Viscosity [η]

The solution viscosity measured in orthochlorophenol at 25° C. is used to calculate the value from the following formula:

$$\eta sp/C=[\eta]+K[\eta]2 \cdot C$$

where ηsp=(solution viscosity/solvent viscosity)−1; C is the weight of the molten polymer per 100 ml of the solvent (g/100 ml, usually 1.2); and K is Huggins' constant (0.343). The solution viscosity and the solvent viscosity were measured using an Ostwald viscometer. Inherent viscosity determined is expressed in unit of [dl/g].

(2) Glass Transition Temperature Tg, and Melting Temperature Tm

As the differential scanning calorimeter, "Robot DSC-RDC220" produced by Seiko Denshi Kogyo K.K. was used, and as the data analyzer, "Disc Session" SSC/5200 produced by the same manufacturer was used. A sample was taken by about 5 mg, and from the thermal curve obtained by heating from room temperature to 300° C. at a heating rate of 20° C./min, Tg and Tm were obtained.

(3) Young's Modulus

Measured according to the method specified in ASTM D 882. Film strength-elongation automatic measuring instrument, "Tensilon AMF/RTA-100" produced by Orienteck K.K. was used to pull a 10 mm wide sample film at a gauge length of 100 mm at a tensile speed of 200 mm/min. From the gradient of the tangential line at the rise of the obtained stress-strain curve, Young's modulus was obtained. The measurement was effected in an atmosphere of 23° C. and 65% PRH.

(4) Heat Shrinkage

Measured according to the method specified in JIS C 2318. Two lines were drawn on a 10 mm wide film to identify a measuring length of about 200 mm, and the distance between the two lines was accurately measured as L0. The sample was allowed to stand in a 100° C. oven for 30 minutes without any load, and the distance between the two lines was measured as L1. The heat shrinkage was obtained from the following formula:

$$\text{Heat shrinkage }(\%)=\{(L0-L1)/L0\}\times100$$

(5) Degree of Crystallinity

Obtained from the density gradient, according to the method specified in JIS K 7112. Density gradient tubes of sodium bromide aqueous solutions were prepared, to measure the density of the film at 25° C. From the density d, the degree of crystallinity was obtained using the following formula:

$$\text{Degree of crystallinity }(\%)=((d-da)/(dc-da))\times100$$

where da is the amorphous density and dc is the perfectly crystalline density. In the case of polyethylene terephthalate, da=1.335 and dc=1.455 g/cm$^3$ according to literature.

(6) Plane Orientation Factor

Refractive indexes were measured according to the method specified in JIS K 7105. As the light source, a sodium lamp was used, and the refractive indexes of the film (machine direction: Na, transverse direction: Nb, normal direction: Nc) were obtained by an Abbe's refractometer (produced by Atago) and the plane orientation factor F was calculated from the following formula. As the mount liquid, methylene iodide was used, and measurement was effected in an atmosphere of 23° C. and 65% RH.

$$F=[(Na+Nb)/2]-Nc$$

(7) Breaking Frequency

Polyethylene terephthalate dried in vacuum was electrostatically brought into contact with a casting drum from a T die, to be cooled and solidified, for obtaining a cast film, and film breaking in the film formation by a linear motor driven simultaneously biaxially stretching tenter oven was observed and evaluated according to the following criterion:

⊚: Film breaking did not occur at all.

○: Film breaking occurred very rarely.

Δ: Film breaking occurred sometimes.

×: Film breaking occurred frequently.

(8) Thickness Fluctuation of Film in the Longitudinal Direction

The thickness of a 30 mm wide and 10 m long sample film take in the machine direction was continuously measured using film thickness tester, "KG601A" and electronic micrometer, "K306C" respectively produced by Anritsu Corp. The film was fed at a rate of 3 m/min. From the maximum thickness T max ($\mu$m) and the minimum thickness T min ($\mu$m) of the 10 m length, $$R=T\ max-T\ min$$

was obtained, and from the average thickness Tave ($\mu$m) of the 10 m length; the thickness fluctuation was obtained from the following formula:

$$\text{Thickness fluctuation } (\%)=(R/Tave)\times 100$$

(9) Creep Compliance

A 4 mm wide film sample was set in TMA (TM-3000) and heat control section TA-1500 produced by Shinku Riko K.K., at a gauge length of 15 mm.

A load of 28 MPa was applied to the film at 50° C. and 65% RH, and kept for 30 minutes, and the elongation of the film in this case was measured. The elongation of the film (in %, $\varDelta$ L) was obtained by personal computer, PC-980-1 produced by NEC Corp. via AD converter ADX-98E produced by Kanops Denshi K.K., and the creep compliance was calculated from the following formula:

$$\text{Creep compliance } (GPa^{-1})=(\varDelta L/100)/0.028$$

(10) High Speed Abrasion Resistance

A tape obtained by slitting a film, to have a width of ½" was driven to run on a guide pin (surface roughness: 100 nm as Ra) using a tape running tester (running speed 250 m/min, running frequency 1 pass, wrap angle 60°, running tension 90 g). After completion of film running, the guide pin was visually observed and evaluated according to the following criterion:

○: Deposition of white powder was hot observed.

Δ: Some deposition of white powder was observed.

×: Much deposition of white powder was observed.

A tape evaluated as b is desirable, but a tape evaluated as Δ is still practically usable.

(11) Electromagnetic Conversion Properties of Magnetic Tape (C/N)

A polyester film-of the present invention was coated on the surface with a magnetic coating material composed as follows and a non-magnetic coating material composed as follows using an extrusion coater (the magnetic coating material was applied as an upper layer with a thickness of 0.1 $\mu$m, and the non-magnetic coating material was applied as a lower layer with the thickness changed), magnetically oriented and dried. Then, the polyester film was coated on the other side with a back coat layer composed as follows, and the coated film was calendered by a small test calender (steel/steel rolls, 5 stages) at a temperature of 85° C. at a linear pressure of 200 kg/cm, and cured at 60° C. for 48 hours. The film was slit into an 8 mm wide tape, to prepare a pan cake. From the pan cake, a 200 m long sample was taken and installed in a cassette, to make a cassette tape.

The tape was set in a marketed VTR for Hi8 (EV-BS3000 produced by SONY), to measure the C/N (carrier to noise ratio) at 7 MHz+1 MHz. The C/N was compared with that of a marketed video tape for Hi8 (120-min MP produced by SONY) and evaluated according to the following criterion:

○: +3 dB or more

Δ: +1 dB to Less than +3 dB

×: Less than +1 dB

A tape evaluated as ○ is desirable, but even a tape evaluated as Δ is practically usable.

(Composition of Magnetic Coating Material)

| | |
|---|---|
| Ferromagnetic metallic powder | 100 parts by weight |
| Sodium sulfonate modified vinyl chloride copolymer | 10 parts by weight |
| Sodium sulfonate modified polyurethane | 10 parts by weight |
| Polyisocyanate | 5 parts by weight |
| Stearic acid | 1.5 parts by weight |
| Oleic acid | 1 part by weight |
| Carbon black | 1 part by weight |
| Alumina | 10 parts by weight |
| Methyl ethyl ketone | 75 parts by weight |
| Cyclohexanone | 75 parts by weight |
| Toluene | 75 parts by weight |
| (Composition of non-magnetic coating material for lower layer) | |
| Titanium oxide | 100 parts by weight |
| Carbon black | 10 parts by weight |
| Sodium sulfonate modified vinyl chloride copolymer | 10 parts by weight |
| Sodium sulfonate modified polyurethane | 10 parts by weight |
| Methyl ethyl ketone | 30 parts by weight |
| Methyl isobutyl ketone | 30 parts by weight |
| Toluene | 30 parts by weight |
| (Composition of back coat) | |
| Carbon black (average particle size 20 nm) | 95 parts by weight |
| Carbon black (average particle size 280 nm) | 10 parts by weight |
| α alumina | 0.1 part by weight |
| Zinc oxide | 0.3 part by weight |
| Sodium sulfonate modified polyurethane | 20 parts by weight |
| Sodium sulfonate modified vinyl chloride copolymer | 30 parts by weight |
| Cyclohexanone | 200 parts by weight |
| Methyl ethyl ketone | 300 parts by weight |
| Toluene | 100 parts by weight |

(12) Running Durability and Storage Stability of Magnetic Tape

A polyester film of the present invention was coated on the surface with a magnetic coating material composed as follows to have a thickness of 20 $\mu$m, magnetically oriented and dried. Then, it was coated on the other side with a back coat layer composed as follows, calendered and cured at 60° C. for 48 hours. The film was slit into a ½" wide magnetic tape, and a 670 m long sample was taken from it and installed in a cassette, to make a cassette tape.

(Composition of Magnetic Coating Material)

| | |
|---|---|
| Ferromagnetic metallic powder | 100 parts by weight |
| Modified vinyl chloride copolymer | 10 parts by weight |
| Modified polyurethane | 10 parts by weight |
| Polyisocyanate | 5 parts by weight |
| Stearic acid | 1.5 parts by weight |
| Oleic acid | 1 part by weight |
| Carbon black | 1 part by weight |
| Alumina | 10 parts by weight |
| Methyl ethyl ketone | 75 parts by weight |
| Cyclohexanone | 75 parts by weight |
| Toluene | 75 parts by weight |

(Composition of back coat)

| | |
|---|---|
| Carbon black (average particle size 20 nm) | 95 parts by weight |
| Carbon black (average particle size 280 nm) | 10 parts by weight |
| α alumina | 0.1 part by weight |
| Modified polyurethane | 20 parts by weight |
| Modified vinyl chloride copolymer | 39 parts by weight |
| Cyclohexanone | 200 parts by weight |
| Methyl ethyl ketone | 300 parts by weight |
| Toluene | 100 parts by weight |

The prepared cassette tape was driven to run for 100 hours using Magstar 3590 Model B1A Tape Drive produced by IBM, and the tape running durability. was evaluated according to the following criterion. A tape evaluated as ○ is acceptable.

○: The tape was not elongated or folded at its edges and did not show any abrasion mark.

Δ: The tape was not elongated or folded at its edges, but showed some abrasion marks.

×: The tape was partially elongated and damaged at the edges, showing abrasion marks.

The cassette tape prepared as above had data written using Magstar 3590, Model B1A Tape Drive produced by IBM, and it was stored in an atmosphere of 40° C. and 80% RH for 100 hours. Then, the data were reproduced, to evaluate the storage stability of the tape according to the following criterion. A tape evaluated as ○ is acceptable.

○: The data could be reproduced normally without any shift in track.

Δ: The tape was normal in width, but data could not be partially reproduced.

×: The tape changed in width, and some data could not be reproduced.

(13) Tracking Resistance of Floppy Disc

A. Temperature Affected Tracking Shift Test

As the tracking shift test, the following method was used. Thin metallic layers were formed as magnetic recording layers on both sides of a substrate film by sputtering, and the laminate was punched into a floppy disc with thin metallic layers. A ring head was used for magnetic recording at 15° C. and 60% RH, and the maximum output and the output envelop of the magnetic sheet were measured. Then, the floppy disc was kept at 40° C. and 60% RH, and the maximum output and output envelop were measured. The output envelop measured at 15° C. and 60% RH and that measured at 40° C. and 60% RH were compared, to examine the tracking state. If the difference is smaller, the tracking resistance is better. The tracking resistance was evaluated according to the following criterion:

×: The difference of output envelops was more than 3 dB.

○: The difference of output. envelops was 3 dB or less.

B. Humidity Affected Tracking Shift Test

The floppy disc prepared as described above had data recorded in an atmosphere of 25° C. and 20% relative humidity, and furthermore kept in an atmosphere of 25° C. and 70% relative humidity, to compare the output envelops under those conditions, for examining the tracking state. As in the previous item, the tacking resistance was evaluated according to the following criterion:

×: The difference of output envelops was more than 3 dB.

○: The difference of output envelops was 3 dB or less.

(14) Scratch Resistance of Floppy Disc

The same track magnetically recorded on a floppy disc obtained as described for (13) was scanned more than 100,000 times at a relative running speed of 6 m/sec, to examine the output envelop and the scratches formed on the surface of the magnetic layer. The scratch resistance was evaluated according to the following criterion:

×: Scratches were formed on the surface and the output envelop was unstable.

○: Scratches were not formed on the surface and the output envelop was stable.

(15) Printability on Heat Transfer Ribbon

A polyester film for heat transfer ribbon of the present invention was coated on one side with a fusion preventive layer, and coated on the other side with a heat transfer ink composed as follows to have a thickness of 3.5 μm by a hot melt coater, for producing a heat transfer ribbon.

(Composition of Heat Transfer Ink)

| | |
|---|---|
| Carnauba wax | 60.6 wt % |
| Microcrystalline wax | 18.2 wt % |
| Vinyl acetate ethylene copolymer | 0.1 wt % |
| Carbon black | 21.1 wt % |

On the prepared heat transfer ribbon, black solid was printed by a bar code printer (BC-8) produced by Oaks, to evaluate printability. A ribbon evaluated as ○ is acceptable.

○: Clearly printed.

Δ: Printing shifted in pitch.

×: The ribbon was wrinkled, to disorder printing.

××: During hot melt coating, the film was wrinkled, and could not be coated with the heat transfer ink uniformly.

(16) Evaluation of Properties for Capacitor

A. Insulation Resistance

A polyester film of the present invention had aluminum vapor-deposited in vacuum to have a surface resistance value of 2 Ω/sq. In this case, the aluminum was deposited in stripes with longitudinal margins (57 mm wide aluminum deposited portions and 3 mm wide margins were formed alternately). Then, the film was slit at the centers of the respective aluminum deposited portions and at the centers of the respective margins by blades, to obtain 30 mm wide tapes with a 1.5 mm margin on the left or right respectively. They were wound into reels. An aluminum deposited film with a margin-on the left and that with a margin on the right were overlaid as one pair, and wound at a length to give a capacity of 1.5 μF. The wound product was formed by pressing at 120° C. at a pressure of 20 kg/cm² for 10 minutes. On both the ends, metallikon was thermally sprayed as electrodes, and lead wires were attached, to make a capacitor sample. In this way, one thousand 1.5 μF capacitor samples were prepared and their insulation resistances were measured as one-minute values at an applied voltage of 500 V by a super-insulation resistance tester 4329A produced by YHP in an atmosphere of 23° C. and 65% RH. Capacitor samples of less than 500 MΩ in insulation resistance were judged to be defective. The lot was evaluated according to the following criterion. A lot evaluated as ⊚, ○ or Δ is acceptable in the present invention.

⊚: The number of defective samples was less than 10.

○: The number of defective samples was 10 to less than 20.

Δ: The number of defective samples was 20 to less than 50.

×: The number of defective samples was 50 or more.

B. Dielectric Breakdown Voltage

The dielectric breakdown voltage was evaluated as described below according to the method stated in JIS C 2318, but using a non-metallized film as a specimen.

An about 2 mm thick rubber sheet with a Shore hardness of about 60° was laid on a metallic flat plate with a proper size, and ten overlaid about 6 μm thick aluminum foils were placed on it as a bottom electrode while an about 50 g brass cylinder with a diameter of 8 mm, with about 1 mm roundness around it and with a smooth flawless bottom face was placed as a top electrode. The specimen had been allowed to stand in an atmosphere of 20±5° C. and 65±5% relative humidity for more than 48 hours beforehand. The specimen was held between the top electrode and the bottom electrode, and a DC voltage was applied between both the electrodes from a DC power supply in an atmosphere of 20±5° C. and 65±5% relative humidity and raised from 0 V at a rate of 100 V per second till dielectric breakdown occurred. Fifty specimens were tested, and the respective dielectric breakdown voltages were divided by the thickness of the specimen. Then quotients were averaged, and when the value was 400 V/μm or more, the lot was acceptable (○).

(17) Image Property of Thermal Mimeographic Stencil Paper

To a polyester film of the present invention, a nonwoven fabric obtained by the following method was bonded using a vinyl acetate based adhesive. The film was coated with a silicone based releasing agent on the side opposite to the nonwoven fabric side, to obtain thermal mimeographic stencil paper. The stencil paper was supplied into "RISOGRAPH" GR375 produced by Riso Kagaku Kogyo K.K., and a black solid original was used for making printing paper. The printing paper was used for printing 20 sheets, and the voids and shade fluctuation of the printed image of the 20th sheet were visually observed and evaluated according to the following criteria:

(Voids)

○: No void was observed at all.

Δ: Some voids were observed.

×: Voids were remarkably observed.

(Shade Fluctuation)

○: No shade fluctuation was observed at all.

Δ: Some shade fluctuation was observed.

×: Shade fluctuation was remarkably observed.

The printing paper evaluated as ○ or Δ is practically usable.

[Production of Main Fibers]

Chips of polyethylene terephthalate were molten at 290° C., and the molten polymer was discharged from a die with 900 holes at 285° C. The fibers were wound at a speed of 1000 m/min.

The non-stretched fibers were stretched to 3.8 times in 80° C. water, heat set under tension at 200° C., heat set with relaxation at 125° C., and cut at 5 mm, to obtain main fibers A with an average fiber diameter of 5 μm and a birefringence of 0.20.

[Production of Non-stretched Fibers]

On the other hand, polyethylene terephthalate chips were molten at 290° C., and the molten polymer was discharged from a die with 900 holes at 285° C., and cut at 5 mm, to obtain non-stretched fibers a with an average fiber diameter of 8 μm with a birefringence of 0.05.

[Paper Making]

The main fibers A and the non-stretched fibers a were sufficiently mixed and dispersed at a ratio by weight of 80:20 in a pulper, and the mixture was processed by a cylinder paper machine at a speed of 10 m/min, and heated and dried by a Yankee drier (surface temperature 130° C.). The paper had an areal unit weight of 8 g/m². Then, it was pressed by a calender of metallic/elastic rolls at a metallic roll surface temperature of 210° C. at a linear pressure of 15 kg/cm, to obtain a 25 μm thick nonwoven fabric.

EXAMPLE

The present invention is described below based on examples and comparative examples.

Example 1

Pellets of polyethylene terephthalate (inherent viscosity 0.65, glass transition temperature 75° C., melting point 255° C., containing 0.1 wt % of spherical crosslinked polystyrene particles with an average particle size of 0.3 μm) are dried in vacuum at 180° C. for 3 hours, supplied into an extruder heated to 280° C., and melt-extruded from a T die as a sheet. The sheet is electrostatically brought into contact with a cooling drum with a surface temperature of 25° C., to be cooled and solidified, for obtaining a cast film. The cast film is held at both the edges by clips, introduced into a linear motor driven simultaneously biaxially stretching tenter oven, and heated to a film temperature of 100° C., and simultaneous biaxial small-ratio stretching at an area stretching ratio of 1.082 times (1.04 times in the machine direction, and 1.04 times in the transverse direction) is effected 50 times continuously. The stretching halt period between the respectively successive two times of small-ratio stretching is 1/10 of the time taken for the small-ratio stretching effected immediately before. Then, the film was heatset at 210° C., relaxed in a 120° C. cooling zone at a relaxation rate of 2% in the machine direction and 2% in the transverse direction, gradually cooled to room temperature, and wound. The film is controlled to have a thickness of 9 μm by adjusting the amount of extrusion. The clip temperature at the time of stretching is 100° C. The obtained film reached an area stretching ratio of about 50 times, and is high as 58% in the degree of crystallinity, being a high quality film less in thickness fluctuation with both a high Young's modulus and small heat shrinkage.

At the time of film formation, film breaking little occurred, and a film with high film properties and quality could be very stably obtained.

Examples 2 to 5 and Comparative Example 1

Biaxially oriented polyester films are obtained as described for Example 1, except that the ratio and repetition frequency of the small-ratio stretching, and total area stretching ratio are changed. In Example 2 and Comparative Example 1 where the small-ratio stretching was repeated 3 times and twice, simultaneous biaxial stretching is effected by one step after completion of small-ratio stretching, to achieve a total area stretching ratio of 25 times. When the repetition frequency of small-ratio stretching is increased from 3 times, film breaking frequency declined, and the total area stretching ratio tended to be higher. When the repetition frequency of small-ratio stretching is increased for stretching at higher ratios, the film became higher in the degree of crystallinity, and a high quality film with high rigidity, small heat shrinkage and less thickness fluctuation could be obtained.

TABLE 1

| | Simultaneous biaxial small-ratio stretching conditions | | | Young's | | | | |
|---|---|---|---|---|---|---|---|---|
| | Area stretching ratio (ratio in machine direction × ratio in transverse direction) | Repetition frequency | Total area stretching ratio | modulus (GPa) (MD/TD) | Heat shrinkage (MD/TD) (%) (100° C., 30 min) | Degree of crystallinity (%) | Breaking frequency | Thickness fluctuation (%) |
| Example 1 | 1.082 (1.04 × 1.04) | 50 | 50.5 | 7.8/8.0 | 0.4/0.3 | 58 | ◉ | 5 |
| Example 2 | 2.250 (1.50 × 1.50) | 3 | 25.0 | 5.5/5.4 | 0.9/0.8 | 46 | ○ | 7 |
| Example 3 | 1.440 (1.20 × 1.20) | 10 | 38.3 | 6.5/6.4 | 0.4/0.3 | 52 | ○ | 5 |
| Example 4 | 1.020 (1.01 × 1.01) | 210 | 65.3 | 8.2/8.1 | 0.3/0.2 | 62 | ◉ | 4 |
| Example 5 | 2.250 (1.50 × 1.50) | 5 | 57.7 | 7.6/7.8 | 1.0/0.7 | 50 | ○ | 6 |
| Comparative Example 1 | 2.250 (1.50 × 1.50) | 2 | 25.0 | 4.8/4.5 | 1.2/1.3 | 43 | Δ | 10 |

Comparative Examples 2 to 4

Biaxially oriented polyester films are obtained as described for Example 1 except that the films are stretched without small-ratio stretching. When a 100° C. film is stretched to 4.3 times in the machine direction and subsequently to 4.3 times in the transverse direction by a simultaneously biaxially stretching tenter oven or simultaneously biaxially stretched to 4.3 times respectively in the machine and transverse directions, the film obtained is low in Young's modulus, large in heat shrinkage and also large in thickness fluctuation (Comparative Examples 2 and 3). When a film is simultaneously biaxially stretched to 4.0 times respectively in the machine and transverse directions and subsequently simultaneously stretched to 1.3 times respectively in the machine and transverse directions, film breaking occurs frequently, and the heat shrinkage of the film becomes large (Comparative Example 4).

Examples 6 to 10

In these examples, the degree of crystallinity reached after small ratio-stretching is changed. Biaxially oriented polyester films are obtained as described in Example 1 except that the ratio and repetition frequency of small-ratio stretching are changed and that the total are a stretching ratio is set at 50 times by one step of simultaneous biaxial stretching after continuously repeating the small-ratio stretching. The stretching ratios in the machine and transverse directions by one time of small-ratio stretching are equal. When the degree of crystallinity of the film after small-ratio stretching is 2% or 34%, the Young's modulus is low, and the heat shrinkage is large.

TABLE 2

| | Stretching conditions | | Total area stretching ratio | Young's modulus (GPa) (MD/TD) | Heat shrinkage (MD/TD) (%) (100° C., 30 min)) | Degree of crystallinity (%) | Breaking frequency | fluctuation (%) |
|---|---|---|---|---|---|---|---|---|
| | Ratio of 1st step (stretching mode) | Ratio of 2nd step (stretching mode) | | | | | | |
| Comparative Example 2 | 4.3 × 4.3 (longitudinal and lateral sequential) | No stretching | 18.5 | 4.4/4.5 | 0.7/0.6 | 42 | Δ | 10 |
| Comparative Example 3 | 4.3 × 4.3 (simultaneous) | No stretching | 18.5 | 3.8/4.2 | 0.5/0.6 | 42 | ○ | 11 |
| Comparative Example 4 | 4.0 × 4.0 (simultaneous) | 1.3 × 1.3 (simultaneous) | 27.0 | 6.2/6.1 | 1.4/1.5 | 44 | × | 9 |

TABLE 3

| | Simultaneous biaxial small-ratio stretching conditions | | | Young's modulus (GPa) (MD/TD) | Heat shrinkage (MD/TD) (%) (100° C., 30 min) | Degree of crystallinity (%) |
|---|---|---|---|---|---|---|
| | Area stretching ratio by small-ratio stretching | Repetition frequency | Degree of crystallinity after small-ratio stretching (%) | | | |
| Example 6 | 1.020 | 40 | 2 | 6.2/6.4 | 1.1/0.9 | 49 |
| Example 7 | 1.082 | 30 | 4 | 7.4/7.5 | 0.6/0.7 | 55 |
| Example 8 | 1.020 | 100 | 7 | 7.9/8.2 | 0.5/0.5 | 58 |
| Example 9 | 1.020 | 150 | 15 | 8.3/8.4 | 0.4/0.5 | 60 |
| Example 10 | 1.210 | 20 | 34 | 7.3/7.4 | 0.9/0.8 | 53 |

Note: In all of Examples 6 to 10, the total area stretching ratio was 50 times, and the heat treatment temperature was 210° C.

Examples 11 to 13

Biaxially oriented polyester films are obtained as described for Example 4, except that temperature zones of 100° C., 140° C., 210° C. and 250° C. are established in the film flow direction in the simultaneously biaxially stretching tenter oven, to change the temperature condition of the small-ratio stretching. When the small-ratio stretching is effected in high temperature zones of 210° C. and 250° C., the film is raised in Young's modulus and lowered in heat shrinkage.

simultaneously biaxially stretching tenter oven, and heated to a film temperature of 115° C., and small-ratio stretching to 1.04 times in the machine direction was effected 20 times continuously. The film is then simultaneously biaxially stretched at 80° C. to 4 times in the machine direction and 5 times in the transverse direction. The stretching halt period between the respectively successive two times of small-ratio stretching was $\frac{1}{10}$ of the time taken for the small-ratio stretching effected immediately before. Then, the film is heatset at 210° C., relaxed in a 120° C. cooling zone at a relaxation rate of 2% in the machine direction and 2% in the transverse direction, gradually cooled to room temperature, and wound. The film is controlled to have a thickness of 10 μm by adjusting the amount of extrusion. The film obtained had a high Young's modulus and low heat shrinkage.

TABLE 4

| | Repetition frequencies of simultaneous biaxial small-ratio stretching in respective temperature zones | | | | Total area stretching ratio | Young's modulus (GPa) (MD/TD) | Heat shrinkage (MD/TD) (%) (100° C., 30 min) | Degree of crystallinity (%) |
|---|---|---|---|---|---|---|---|---|
| | 100° C. | 140° C. | 210° C. | 250° C. | | | | |
| Example 11 | 100 | 50 | 50 | 10 | 65.3 | 8.8/8.6 | 0.3/0.3 | 64 |
| Example 12 | 100 | 10 | 50 | 50 | 65.3 | 9.0/9.2 | 0.2/0.2 | 66 |
| Example 13 | 100 | 110 | 0 | 0 | 65.3 | 8.4/8.3 | 0.4/0.3 | 61 |

Note: The area stretching ratio by one time of small-ratio stretching was 1.02 times (1.01 times respectively in the machine and transverse directions)

Example 14

A cast film obtained as described for Example 1 is held at both the edges by clips, introduced into a linear motor driven simultaneously biaxially stretching tenter oven, heated to a film temperature of 100° C., and stretched to 2.5 times respectively in the machine direction and the transverse direction sequentially, and the small-ratio stretching to an area stretching ratio of 1.44 times (1.2 times in the machine direction and 1.2 times in the transverse direction) is effected 6 times continuously. In this case, temperature zones of 150° C., 180° C. and 210° C. are established in this order, and the small-ratio stretching is effected twice respectively. The stretching halt period between the respectively successive two times of small-ratio stretching is $\frac{1}{10}$ of the time taken for the small-ratio stretching effected immediately before. Then, the film is heatset at 210° C., relaxed in a 120° C. cooling zone at a relaxation rate of 2% in the machine direction and 2% in the transverse direction, gradually cooled to room temperature, and wound. The film thickness is controlled to have a thickness of 10 μm by adjusting the amount of extrusion. The film obtained had a high Young's modulus and low heat shrinkage.

Example 15

A cast film obtained as described in Example 1 is held at both the edges by clips, introduced into a linear motor driven

Example 16

A cast film obtained as described for Example 1 is held at both the edges by clips, introduced into a linear motor driven simultaneously biaxially stretching tenter oven, and heated to a film temperature of 100° C., and small-ratio stretching to an area stretching ratio of 1.082 times (1.04 times in the machine direction and 1.04 times in the transverse direction) and small-ratio stretching to 1.04 times in the transverse direction only are effected respectively alternately 10 times (20 times of small-ratio stretching in total). Then, the film is simultaneously biaxially stretched to 4 times respectively in the machine and transverse directions. The stretching halt period between the respectively successive two times of small-ratio stretching is $\frac{1}{10}$ of the time taken for the small-ratio stretching effected immediately before. Then, the film is heatset at 210° C., relaxed in a 120° C. cooling zone at a relaxation rate of 2% in the machine direction and 2% in the, transverse direction, gradually cooled to room temperature, and wound. The film is controlled to have a thickness of 10 μm by adjusting the amount of extrusion. The film obtained had a high Young's modulus and low heat shrinkage.

TABLE 5

| | Stretching conditions | | Total area stretching ratio | Young's modulus (GPa) (MD/TD) | Heat shrinkage (MD/TD) (%) (100° C., 30 min) | Degree of crystallinity (%) |
|---|---|---|---|---|---|---|
| | 1st step | 2nd step | | | | |
| | Ratio in machine direction × ratio in transverse direction, (stretching mode) repetition frequency | Ratio in machine direction × ratio in transverse direction, (stretching mode) repetition frequency | | | | |
| Example 14 | 2.5 × 2.5 (longitudinal lateral sequential) 1 time | 1.2 × 1.2 (simultaneous) 6 times | 55.7 | 7.6/7.8 | 0.7/0.5 | 52 |
| Example 15 | 1.04 × 1.0 (longitudinal) 20 times | 4 × 5 (simultaneous) 1 time | 43.8 | 6.5/6.7 | 0.6/0.5 | 55 |

TABLE 5-continued

| | Stretching conditions | | | Young's | | |
|---|---|---|---|---|---|---|
| | 1st step | 2nd step | | modulus | Heat shrinkage | Degree of |
| | Ratio in machine direction × ratio in transverse direction, (stretching mode) repetition frequency | Ratio in machine direction × ratio in transverse direction, (stretching mode) repetition frequency | Total area stretching ratio | (GPa) (MD/TD) | (MD/TD) (%) (100° C., 30 min) | crystallinity (%) |
| Example 16 | 1.04 × 1.04 (simultaneous) 10 times 1.0 × 1.04 lateral) 10 times | 4 × 4 (simultaneous) 1 time | 52.2 | 7.7/7.0 | 0.5/0.4 | 56 |

Note: As the 1st step stretching of Example 16, simultaneous stretching and lateral stretching only were effected alternately.

Example 17 and Comparative Example 5

Polyethylene terephthalate with an inherent viscosity of 1.0 (glass transition temperature 74° C., melting point 255° C., containing 0.1 wt % of spherical crosslinked polystyrene particles with an average particle size of 0.3 μm) is used as a raw polyester, to examine the effects of simultaneous biaxial small-ratio stretching. Six point five micrometers thick biaxially oriented polyester films are obtained as described for Example 1, except that the temperature of the stretching zone is 115° C., that the temperature of the heat treatment zone is 210° C. and that the stretching pattern is changed. When small-ratio stretching is effected, small-ratio stretching to achieve an area stretching ratio of 1.082 times (1.04 times in the machine direction and 1.04 times in the transverse direction) is repeated 50 times continuously. The stretching halt period between the respectively successive two times of small-ratio stretching was 1/10 of the time taken for the small-ratio stretching effected immediately before.

tion temperature 125° C., melting point 265° C., containing 0.1 wt % of spherical crosslinked polystyrene particles with an average particle size of 0.3 μm) or a copolymer consisting of 90 mol % of ethylene terephthalate and 10 mol % of ethylene-2,6-naphthalate (glass transition temperature 84° C., melting point 235° C., containing 0.1 wt % of spherical crosslinked polystyrene particles with an average particle size of 0.3 μm) is used, and that the stretching temperature is set as shown in Table 6. Also when polyethylene-2,6-naphthalate or said copolymer is used as the raw polymer, the effects of the small-ratio stretching by the present invention could be remarkably observed. If simultaneous biaxial small-ratio stretching is effected repetitively, the total area stretching ratio and the degree of crystallinity can be enhanced, and a high quality polyester film with a high Young's modulus and low heat shrinkage can be stably produced.

TABLE 6

| | Raw polyester | | Film forming conditions by simultaneous biaxial stretching | | | Young's | | |
|---|---|---|---|---|---|---|---|---|
| | Composition | Inherent viscosity (dl/g) | Small-ratio stretching | Temperature (° C.), Stretching/Heat treatment | Total area stretching ratio | modulus (GPa) (MD/TD) | Heat shrinkage (MD/TD) (%) (100° C., 30 min) | Degree of crystallinity (%) |
| Example 17 | PET | 1.0 | Effected | 115/210 | 58.0 | 8.6/8.4 | 0.6/0.8 | 43 |
| Example 18 | PEN | 0.65 | Effected | 135/210 | 72.0 | 10.2/10.5 | 0.2/0.2 | 30 |
| Example 19 | PET/PEN (90/10) | 0.65 | Effected | 120/210 | 65.0 | 8.5/8.6 | 0.5/0.4 | 47 |
| Comparative Example 5 | PET | 1.0 | Not effected | 115/210 | 36.0 | 5.8/6.2 | 2.1/2.5 | 38 |
| Comparative Example 6 | PEN | 0.65 | Not effected | 135/210 | 49.0 | 7.2/7.4 | 0.3/0.4 | 24 |
| Comparative Example 7 | PET/PEN (90/10) | 0.65 | Not effected | 120/210 | 40.0 | 6.2/6.3 | 1.6/1.3 | 42 |

Note: When small-ratio stretching was effected, the area stretching ratio by one time of small-ratio stretching was 1.082 times (1.04 times respectively in the machine and transverse directions), and it was repeated 50 times continuously for a cast film.

When the small-ratio stretching is not effected, simultaneous biaxial stretching at equal ratios in the machine and transverse directions is effected in one step. Unlike the case of Comparative Example 5, in Example 17 where the small-ratio stretching is effected, the total area stretching ratio is high, and the film obtained had a high Young's modulus and low heat shrinkage.

Examples 18 and 19 and Comparative Examples 6 and 7

Six point five micrometers thick biaxially oriented polyester films are obtained as described for Example 17 and Comparative Example 5, except that polyethylene-2,6-naphthalate with an inherent viscosity of 0.65 (glass transi-

Example 20 (Tables 7 and 8)

A cast film obtained as described for Example 1 held at both the edges by clips, introduced into a linear motor driven simultaneously biaxially stretching tenter oven, and heated to a film temperature of 100° C., and a series of operation consisting of simultaneous biaxial stretching at an area stretching ratio of 2.25 times (1.5 times in the machine direction and 1.5 times in the transverse direction) and successive relaxation (at a relaxation rate of 5% in the machine direction and 5% in the transverse direction) is effected 5 times continuously. Then, the film is heatset at 210° C., relaxed in a 120° C. cooling zone at a relaxation rate of 2% in the machine direction and 2% in the transverse direction, gradually cooled to room temperature, and wound. The film is controlled to achieve a thickness of 10 μm by adjusting the amount of extrusion. The clip temperature during stretching is 100° C. The film obtained reached a total area stretching ratio of 34.5 times and had both a high Young's modulus and thermal dimensional stability, being a high quality film with little thickness fluctuation. At the time of film formation, film breaking little occurred, and a film with high film properties and quality could be very stably obtained. If the stretching ratio and the repetition frequency are the same as in Example 5 and relaxation treatment is added, then the thermal dimensional stability can be improved though the Young's modulus declines slightly.

Examples 21 to 23

Biaxially oriented polyester films are obtained as described for Example 20, except that the ratio of small-ratio stretching of each time, relaxation rate, repetition frequency and total area stretching ratio are changed. The obtained polyester films had both a high Young's modulus and thermal dimensional stability, being high quality films with little thickness fluctuation as in Example 20. At the time of film formation, film breaking little occurred, and films with high film properties and quality could be very stably obtained.

Example 24 (Tables 7 and 8)

A cast film obtained as described for Example 1 is simultaneously biaxially stretched at a film temperature of 100° C. at an area stretching ratio of 16.0 times (4.0 times in the machine direction and 4.0 times in the transverse direction) by a simultaneously biaxially stretching tenter oven, successively relaxed (at a relaxation rate of 5% in the machine direction and 5% in the transverse direction), simultaneously biaxially oriented at 170° C. at an area stretching ratio of 2.25 times (at a ratio of 1.5 times in the machine direction and 1.5. times in the transverse direction), and in succession relaxed (at a relaxation rate of 5% in the machine direction and 5% in the transverse direction). Then, the film is heatset at 210° C., relaxed in a 120° C. cooling zone at a relaxation rate of 2% in the machine direction and 2% in the transverse direction, gradually cooled to room temperature, and wound. The obtained polyester film had both a high Young's modulus and thermal dimensional stability, being a high quality film with little. thickness fluctuation as in Example 20. At the time of film formation, film breaking little occurred, and a film with high film properties and quality could be very stably obtained.

Example 25

A cast film obtained as described for Example 1 is held at both the edges by clips, introduced into a linear motor driven simultaneously biaxially stretching tenter ovens and heated to a film temperature of 100° C., and a series of operation consisting of simultaneous biaxial stretching at an area stretching ratio of 1.21 times (1.1 times in the machine direction and 1.1 times in the transverse direction) and successive relaxation (at a relaxation rate of 5% in the machine direction and 5% in the transverse direction) is effected 10 times. Then, simultaneous biaxial stretching at an area stretching ratio of 1.21 times (1.1 times in the machine direction and 1.1 times in the transverse direction) is effected twice, without relaxation. In succession, a series of operation consisting of simultaneous biaxial stretching at an area stretching ratio of 1.21 times (1.1 times in the machine direction and 1.1 times in the transverse direction) and successive relaxation (at a relaxation rate of 5% in the machine direction and 5% in the transverse direction) is effected 30 times. The total repetition frequency of the series of operation consisting of stretching and relaxation is 40 times. The total number of times of stretching only is 2. Then, the film is heatset at 210° C., relaxed in a 120° C. cooling zone at a relaxation rate of 2% in the machine direction and 2% in the transverse direction, gradually cooled to room temperature, and wound. The obtained film had both a high Young's modulus and thermal dimensional. stability, being a high quality film with little thickness fluctuation. At the time of film formation, film breaking little occurred, and a film with high film properties and quality could be very stably obtained.

Example 26

A cast film obtained as described for Example 1 is held at both the edges by clips, introduced into a linear motor driven simultaneously biaxially stretching tenter oven, and heated to a film temperature of 100° C., and a series of operation consisting of simultaneous biaxial stretching at an area stretching ratio of 1.21 times (1.1 times in the machine direction and 1.1 times in the transverse direction) and successive relaxation (at a relaxation rate of 5% in the machine direction and 5% in the transverse direction) is effected 30 times. Then, relaxation (at a relation rate of 5% in the machine direction and 5% in the transverse direction) and in succession a series of operation consisting of similar simultaneous biaxial stretching at 140° C. and successive relaxation is effected 5 times. Then, relaxation (at a relaxation rate of 5% in the machine direction and 5% in the transverse direction) is effected once and in succession a series of operation consisting of similar simultaneous biaxial stretching at 170° C. and successive relaxation is effected 7 times. The total number of times of the series of operation consisting of stretching and relaxation is 42, and the total number of times of relaxation only is 2. Then, the film was heatset at 210° C., relaxed in a 120° C. cooling zone at a relaxation rate of 2% in the machine direction and 2% in the transverse direction, gradually cooled to room temperature, and wound. The obtained film had both a high Young's modulus and thermal dimensional stability, being a high quality film with little thickness fluctuation. At the time of film formation, film breaking little occurred, and a film with high film properties and quality could be very stably obtained.

TABLE 7

| | Stretching ratio, longitudinal × lateral (area ratio) | Relaxation rate (longitudanal/lateral) (%) | Total repetition frequency | Total area ratio |
|---|---|---|---|---|
| Example 20 | 1.5 × 1.5 (2.25) | 5/5 | 5 | 34.5 |
| Example 21 | 1.1 × 1.1 (1.21) | 5/5 | 45 | 52.5 |
| Example 22 | 1.9 × 1.9 (3.61) | 5/5 | 3 | 34.6 |
| Example 23 | 1.5 × 1.5 (2.25) | 1/1 | 5 | 52.2 |
| Example 24 | (1) 4.0 × 4.0 (16.0) | 5/5 | 1 | 29.3 |
| | (2) 1.5 × 1.5 (2.25) | 5/5 | 1 | |
| Example 25 | 1.1 × 1.1 (1.21) | 5/5 | 40 | 49.5 |
| | 1.1 × 1.1 (1.21) | None | 2 | |
| Example 26 | 1.1 × 1.1 (1.21) | 5/5 | 42 | 32.8 |
| | 1.0 × 1.0 (1.0) | 5/5 | 2 | |

TABLE 8

| | Young's modulus (GPa) (MD/TD) | Heat shrinkage (%) (MD/TD) (100° C., 30 min) | Breaking frequency | Thickness fluctuation (%) |
|---|---|---|---|---|
| Example 20 | 7.4/7.5 | 0.6/0.4 | ⊚ | 5 |
| Exampel 21 | 8.4/8.6 | 0.4/0.2 | ⊚ | 4 |

TABLE 8-continued

| | Young's modulus (GPa) (MD/TD) | Heat shrinkage (%) (MD/TD) (100° C., 30 min) | Breaking frequency | Thickness fluctuation (%) |
|---|---|---|---|---|
| Example 22 | 7.3/7.4 | 1.0/0.6 | ○ | 7 |
| Example 23 | 7.8/7.9 | 0.8/0.6 | ○ | 8 |
| Example 24 | 0.2/6.1 | 0.9/0.5 | ○ | 7 |
| Example 25 | 8.8/8.6 | 0.6/0.4 | ⊚ | 6 |
| Example 26 | 8.3/8.5 | 0.4/0.2 | ⊚ | 6 |

Examples 27 and 28

Two extruders are used. Pellets of polyethylene terephthalate (I) (inherent viscosity 0.65, glass transition temperature 75° C., melting temperature 255° C., containing 0.16 wt % of spherical silica particles with an average particle size of 0.07 µm) are dried in vacuum at 180° C. for 3 hours, and supplied into extruder A heated to 280° C., and pellets of polyethylene terephthalate (II) (inherent viscosity 0.65, glass transition temperature 75° C., melting temperature 255° C., containing 0.2 wt % of spherical crosslinked polystyrene particles with an average particle size of 0.3 µm and 0.01 wt % of spherical crosslinked polystyrene particles with an average particle size of 0.8 µm) are dried in vacuum at 180° C. for 3 hours, and supplied into extruder B also heated to 280° C. They are joined in a T die (lamination ration I/II=10/1), and the laminate is electrostatically brought into contact with a casting drum with a surface temperature of 25° C., to be cooled and solidified for preparing a cast laminate film. In Example 27, the film is stretched as described for Example 1, and in Example 28, it is stretched as described for Example 20. The obtained 6.5 µm films are processed for magnetic recording media, and their practical properties as video tape and data tape are evaluated. They were found to have excellent properties as shown in Table 9.

Comparative Example 8

A cast film obtained as described for Example 27 is held at both the edges by clips, introduced into a linear motor driven simultaneously biaxially stretching tenter oven, heated to a film temperature of 95° C., simultaneously biaxially oriented to 3.5 times respectively in the machine and transverse directions, simultaneously biaxially stretched to 1.3 times respectively in the machine and transverse directions at 110° C., heatset at 210° C., relaxed in a 120° C. cooling zone at a relaxation rate of 2% in the machine direction and 2% in the transverse direction, gradually cooled to room temperature, and wound, to obtain a 6.5 µm thick film. The obtained film is processed for a magnetic recording medium. As shown in Table 9, the film is inferior to the films of the present invention in practical properties for a magnetic recording medium.

TABLE 9

| | High speed abrasion resistance | Electro-magnetic conversion properties | Running durability | Storage stability | Creep compliance MD/TD (GPa$^{-1}$) |
|---|---|---|---|---|---|
| Example 27 | ○ | ○ | ○ | ○ | 0.22/0.21 |
| Example 28 | ○ | ○ | ○ | ○ | 0.23/0.22 |
| Comparative Example 8 | x | x | Δ | Δ | 0.34/0.27 |

Examples 29 and 30

Two extruders are used. Pellets of polyethylene terephthalate (I) (inherent viscosity 0.65, glass transition temperature 75° C., melting temperature 255° C., containing no particles) are dried in vacuum at 180° C. for 3 hours and supplied into extruder A heated to 280° C., and pellets of polyethylene terephthalate (II) (inherent viscosity 0.65, glass transition temperature 75° C., melting temperature 255° C., containing 6 wt % of spherical crosslinked polystyrene particles with an average particle size of 0.3 µm) are dried in vacuum at 180° C. for 3 hours and supplied into extruder B heated to 310° C. They are joined in a T die (lamination ratio I/II=250/1), and the laminate is electrostatically brought in contact with a casting drum with a surface temperature of 25° C., to be cooled and solidified, for preparing a cast laminate film. In Example 29, the film is stretched as described for Example 1, and in Example 30, the film is stretched as described for Example 20. The obtained 75 µm thick films are processed for magnetic recording media, and their practical properties as floppy discs are evaluated. They were found to have excellent properties as shown in Table 10.

Comparative Example 9

A cast film obtained as described for Example 29 is held at both the edges by clips, introduced into a linear motor driven simultaneously biaxially stretching tenter oven, heated to a film temperature of 95° C., simultaneously biaxially stretched to 4 times respectively in the machine and transverse directions, heatset at 210° C., relaxed in a 120° C. cooling zone at a relaxation rate of 2% in the machine direction and 2% in the transverse direction, gradually cooled to room temperature, and wound, to obtain a 75 µm thick film. The obtained film is processed for a floppy disc. Its practical properties for a floppy disc are inferior to the those of the films of the present invention as shown in Table 10.

TABLE 10

| | Tracking resistance | | |
|---|---|---|---|
| | Change due to temperature | Change due to humidity | Scratch resistance |
| Example 29 | ○ | ○ | ○ |
| Example 30 | ○ | ○ | ○ |
| Comparative Example 9 | x | x | x |

Examples 31 and 32

Pellets of polyethylene terephthalate (inherent viscosity 0.65, glass transition temperature 75° C., melting point 255° C., containing 0.2 wt % of silicon dioxide particles with an average particle size of 1.0 µm) are dried in vacuum at 180° C. for 3 hours, supplied into an extruder heated to 280° C., and melt-extruded from a T die as a sheet. The sheet is electrostatically brought into contact with a cooling drum with a surface temperature of 25° C., to be cooled and solidified, for obtaining a cast film. A cast film is coated on one side with a coating material composed as follows by a gravure coater, to form a fusion preventive layer with a dry thickness of 0.5 µm.
(Composition of Coating Material)

| Acrylate | 14.0 wt % |
|---|---|
| Amino modified silicone | 5.9 wt % |

-continued

| | |
|---|---|
| Isocyanate | 0.1 wt % |
| Water | 80.0 wt % |

Then, using a simultaneously biaxially stretching tenter oven, in Example 31, the film is stretched as described for Example 1, and in Example 32, the film is stretched as described for Example 20. The obtained 4 μm thick films are processed for heat transfer ribbons, and their practical property for heat transfer ribbons are evaluated. They were found to have an excellent property as shown in Table 11.

Comparative Example 10

A cast film with a fusion preventive layer on one side is obtained as described for Example 31. Then, using a simultaneously biaxially stretching tenter oven, the film is stretched as described for Comparative Example 8, to obtain a 4 μm thick film for a heat transfer ribbon. The practical property of the film for a heat transfer ribbon is inferior to that of the films of the present invention as shown in Table 11.

TABLE 11

| | Printability |
|---|---|
| Example 31 | ○ |
| Example 32 | ○ |
| Comparative Example 10 | x |

Examples 33 and 34

Pellets of polyethylene terephthalate (inherent viscosity 0.65, glass transition temperature 75° C., melting point 255° C., containing 0.1 wt % of agglomerate silica particles with an average particle size of 1.2 μm) are dried in vacuum at 180° C. for 3 hours, supplied into an extruder heated to 280° C., and melt-extruded from a T die as a sheet. The sheet is electrostatically brought into contact with a cooling drum with a surface temperature of 25° C., to be cooled and solidified, for obtaining a cast film.

Then, using a simultaneously biaxially stretching tenter oven, in Example 33, the film is stretched as described for Example 1, and in Example 34, the film is stretched as described for Example 20. The obtained 4 μm thick films are processed for capacitors, and their practical properties are evaluated. They are found to have excellent properties as shown in Table 12.

Comparative Example 11

A cast film obtained as described for Example 33 is stretched as described for Comparative Example 9, to obtain a 4 μm thick film. It is processed for a capacitor and its practical properties are evaluated. As shown in Table 12, its practical properties for a capacitor are inferior to those of the films of the present invention.

TABLE 12

| | Insulation resistance | Dielectric breakdown voltage |
|---|---|---|
| Example 33 | ⊚ | ○ |
| Example 34 | ⊚ | ○ |

TABLE 12-continued

| | Insulation resistance | Dielectric breakdown voltage |
|---|---|---|
| Comparative Example 11 | Δ | x |

Examples 35 and 36

Pellets of polyethylene terephthalate (inherent viscosity 0.65, glass transition temperature 75° C., melting point 255° C., containing 0.4 wt % of agglomerate silica particles with an average particle size of 1.2 μm) are dried in vacuum at 180° C. for 3 hours, supplied into an extruder heated to 280° C., and melt-extruded from a T die as a sheet. The sheet is electrostatically brought into contact with a cooling drum with a surface temperature of 25° C., to be cooled and solidified, for obtaining a cast film.

Then, using a simultaneously biaxially stretching tenter oven, in Example 35, the film is stretched as described for Example 1, and in Example 36, the film is stretched as described for Example 20. The obtained 4 μm thick films are processed for thermal mimeographic stencil paper, and their practical properties are evaluated. They are found to have excellent properties as shown in Table 13.

Comparative Example 12

A cast film obtained as described for Example 35 is stretched as described for Comparative Example 9, to obtain a 4 μm thick film. It is processed for a thermal mimeographic stencil paper, and its practical properties are evaluated. As shown in Table 13, its practical properties for a thermal mimeographic stencil paper are inferior to those of the films of the present invention.

TABLE 13

| | Voids | Shade fluctuation |
|---|---|---|
| Example 35 | ○ | ○ |
| Example 36 | ○ | ○ |
| Comparative Example 12 | x | Δ |

INDUSTRIAL APPLICABILITY

According to the production method of the present invention, a high quality polyester film with a high rigidity, low heat shrinkage, less thickness fluctuation and less surface defects can be stably produced at a less breaking frequency. The present invention can be widely applied as a method for producing various films for magnetic recording media, capacitors, heat transfer ribbons, thermal mimeographic stencil paper, packaging, etc., and the present invention can also provide a new polyester film with properties and quality far more excellent than the mechanical properties of conventional polyester films.

What is claimed is:

1. A method for producing a polyester film, in which a film made of a resin mainly composed of polyester chains is stretched by a simultaneously biaxially stretching tenter oven, comprising consecutively performing the step of effecting small-ratio stretching at a film area stretching ratio of 1.0005 to 2.0 times three times or more to disentangle the polyester chains and ease the microstructure of the film so that the total area stretching ratio of the film is enhanced such that a polymer film having a high Young's modulus and small heat shrinkage is obtained, to achieve a total area stretching ratio of 25 to 150 times, wherein the high Young's modulus is 8 to 30 Gpa and the heat shrinkage is 2% or less.

2. A method for producing a polyester film, according to claim 1, wherein said small-ratio stretching is effected continuously three times or more.

3. A method for producing a polyester film, according to claim 1, wherein said small-ratio stretching is repeated 10 to less than 10000 times.

4. A method for producing a polyester film, according to claim 1, wherein said small-ratio stretching of a cast film is effected in a temperature range of (glass transition temperature (Tg)+10)° C. to (Tg+120)° C.

5. A method for producing a polyester film, according to claim 1, wherein said small-ratio stretching of a cast film is repeated continuously till the degree of crystallinity becomes 3% to less than 30%.

* * * * *